US009881633B2

(12) United States Patent
Kudou

(10) Patent No.: US 9,881,633 B2
(45) Date of Patent: Jan. 30, 2018

(54) AUDIO SIGNAL PROCESSING DEVICE, AUDIO SIGNAL PROCESSING METHOD, AND AUDIO SIGNAL PROCESSING PROGRAM

(71) Applicant: P SOFTHOUSE CO., LTD., Sendai-shi (JP)

(72) Inventor: Takuma Kudou, Miyagi (JP)

(73) Assignee: P SOFTHOUSE CO., LTD., Sendai-shi (JP)

( * ) Notice: Subject to any disclaimer, the term of this patent is extended or adjusted under 35 U.S.C. 154(b) by 0 days.

(21) Appl. No.: 15/503,297

(22) PCT Filed: Sep. 12, 2014

(86) PCT No.: PCT/JP2014/074281
§ 371 (c)(1),
(2) Date: Feb. 10, 2017

(87) PCT Pub. No.: WO2016/024363
PCT Pub. Date: Feb. 18, 2016

(65) Prior Publication Data

US 2017/0236529 A1 Aug. 17, 2017

(30) Foreign Application Priority Data

Aug. 14, 2014 (JP) ................................ 2014-165296

(51) Int. Cl.
*H04B 15/00* (2006.01)
*G10L 21/0272* (2013.01)
(Continued)

(52) U.S. Cl.
CPC ...... *G10L 21/0272* (2013.01); *G10L 21/0232* (2013.01); *G10L 21/0208* (2013.01)

(58) Field of Classification Search
CPC ............ G10L 21/0272; G10L 21/0232; G10L 21/0208
See application file for complete search history.

(56) References Cited

U.S. PATENT DOCUMENTS

2003/0023430 A1 1/2003 Wang et al.
2005/0195990 A1 9/2005 Kondo et al.
(Continued)

FOREIGN PATENT DOCUMENTS

JP 9-258792 A 10/1997
JP 10-62460 A 3/1998
(Continued)

OTHER PUBLICATIONS

International Search Report dated Dec. 16, 2014 in PCT/JP2014/074281 filed Sep. 12, 2014.
(Continued)

*Primary Examiner* — Andrew L Sniezek
(74) *Attorney, Agent, or Firm* — Oblon, McClelland, Maier & Neustadt, L.L.P.

(57) ABSTRACT

An audio signal processing device includes: a short-time fast Fourier transform unit that generates a signal in a frequency domain obtained by performing a short-time fast Fourier transform on an input audio signal; a steady sound determining unit that determines whether a waveform of a peak portion included in a waveform of the signal in a frequency domain is a steady sound; a filter coefficient calculation unit that dynamically calculates a filter coefficient on the basis of a result of determination made by the steady sound determining unit; a comb filter that operates according to the filter coefficient calculated by the filter coefficient calculation unit so as to filter a signal in a frequency domain; and an inverse
(Continued)

Fourier transform unit that transforms an output of the comb filter into a signal in a time domain and outputs the signal in a time domain.

6 Claims, 10 Drawing Sheets

(51) Int. Cl.
*G10L 21/0232* (2013.01)
*G10L 21/0208* (2013.01)

(56) References Cited

U.S. PATENT DOCUMENTS

| | | | |
|---|---|---|---|
| 2008/0069364 A1 | 3/2008 | Itou et al. | |
| 2011/0261977 A1 | 10/2011 | Hiroe | |
| 2014/0243048 A1* | 8/2014 | Kwan | G10L 21/0208 455/570 |
| 2015/0349841 A1* | 12/2015 | Mani | H04M 9/082 379/406.09 |

FOREIGN PATENT DOCUMENTS

| | | |
|---|---|---|
| JP | 2002-149200 A | 5/2002 |
| JP | 2005-257805 A | 9/2005 |
| JP | 2005-266797 A | 9/2005 |
| JP | 2006-178333 A | 7/2006 |
| JP | 2008-76676 A | 4/2008 |
| JP | 2011-215317 A | 10/2011 |
| JP | 2012-177828 A | 9/2012 |

OTHER PUBLICATIONS

Notification of Reasons for Refusal dated Jul. 17, 2015 in Japanese Patent Application No. 2014-165296 (with unedited computer generated English translation).
Notification of Reasons for Refusal dated Dec. 1, 2015 in Japanese Patent Application No. 2014-165296 (with unedited computer generated English translation).
Decision of Refusal dated Apr. 26, 2016 in Japanese Patent Application No. 2014-165296 (with unedited computer generated English translation).
Decision to Grant a Patent dated Sep. 13, 2016 in Japanese Patent Application No. 2014-165296 (with unedited computer generated English translation).
Ronald H. Frazier, et al., "Enhancement of speech by adaptive filtering" Proceedings of the 30$^{th}$ IEEE International Conference on Acoustics, Speech and Signal Processing (ICASSP'76), Apr. 1976, pp. 251-253.

* cited by examiner (a) STEADY SOUND (b) SPECTRUM OF STEADY SOUND (a) UNSTEADY SOUND (AMPLITUDE-MODULATED)

(b) SPECTRUM OF UNSTEADY SOUND (AMPLITUDE-MODULATED)

(a) UNSTEADY SOUND (FREQUENCY-MODULATED)

(b) SPECTRUM OF UNSTEADY SOUND (FREQUENCY-MODULATED)

(a) MUSICAL COMPOSITION HAVING MULTIPLE SOUND SOURCES MIXED (b) SPECTRUM OF (a)

(a) STEADY SOUND (b) UNSTEADY SOUND (a) CENTER FREQUENCY: 440 HZ (b) CENTER FREQUENCY: 880 HZ

SPECTRUM OF MUSICAL COMPOSITION HAVING MULTIPLE SOUND SOURCES MIXED

AUDIO SIGNAL PROCESSING DEVICE, AUDIO SIGNAL PROCESSING METHOD, AND AUDIO SIGNAL PROCESSING PROGRAM

FIELD

The present invention relates to a technique for separating and extracting or eliminating a specific sound source from an audio signal in which a plurality of sound sources are mixed.

BACKGROUND

There are various techniques for separating and extracting sound from a specific sound source from an audio signal in which a plurality of sound sources are mixed. For example, there is a technique that identifies the direction of a sound source by performing independent component analysis on multiple input signals from a microphone array, thereby separating the sound source. There are many literatures regarding this technique, such as one aimed at improving accuracy and one in which the way of reducing the amount of calculation is improved (for example, Patent Literature 1 below).

CITATION LIST

Patent Literature

Patent Literature 1: Japanese Patent Application Laid-open Publication No. 2011-215317

SUMMARY

Technical Problem

The above conventional technique is an extension of the independent component analysis, with the independent component analysis requiring at least N number of microphones to separate N sound sources from each other. Thus, for example, when processing a stereo channel signal that is pre-recorded, such as commercially available music, there is a problem in that not enough separation effect is obtained because, with only a stereo channel signal as information, the amount of information is too low.

Further, the above conventional technique is one that depends on the hardware configuration at the time of recording and it is necessary to perform a pre-training process and a time-consuming signal analysis, and thus there is a problem in that a steady sound cannot be extracted or eliminated in real time.

The present invention is made in view of the above, and an object thereof is to provide an audio signal processing device, an audio signal processing method, and an audio signal processing program that can extract or eliminate a steady sound in real time from an audio signal containing a plurality of sound sources using only instantaneous signal processing and without performing, for example, a pre-training process and a time-consuming signal analysis.

Solution to Problem

In order to solve the above problems and achieve the object, an aspect of the present invention is an audio signal processing device that separates a specific sound source from an audio signal in which a plurality of sound sources are mixed and extracts or eliminates the specific sound source. The audio signal processing device includes: a short-time fast Fourier transform unit that performs a short-time fast Fourier transform on an input audio signal; a steady sound determining unit that determines, on a basis of a signal in a frequency domain generated by the short-time fast Fourier transform unit, whether a waveform of a peak portion included in a waveform of the signal in a frequency domain is a steady sound; a filter coefficient calculation unit that dynamically calculates a filter coefficient on a basis of a result of determination made by the steady sound determining unit; a comb filter that operates according to the filter coefficient calculated by the filter coefficient calculation unit so as to filter a signal output from the short-time fast Fourier transform unit; and an inverse Fourier transform unit that transforms an output of the comb filter into a signal in a time domain and outputs the signal in a time domain.

Advantageous Effects of Invention

According to the present invention, it produces the effect of being able to extract or eliminate a steady sound in real time from an audio signal containing a plurality of sound sources using only instantaneous signal processing and without depending on the hardware configuration at the time of recording and without performing, for example, a pre-training process and a time-consuming signal analysis.

DESCRIPTION OF EMBODIMENTS

An audio signal processing device, an audio signal processing method, and an audio signal processing program according to an embodiment of the present invention will be described below with reference to the accompanying drawings. Note that the embodiment below is not intended to limit the present invention.

Principle of the Invention

Figure 1:
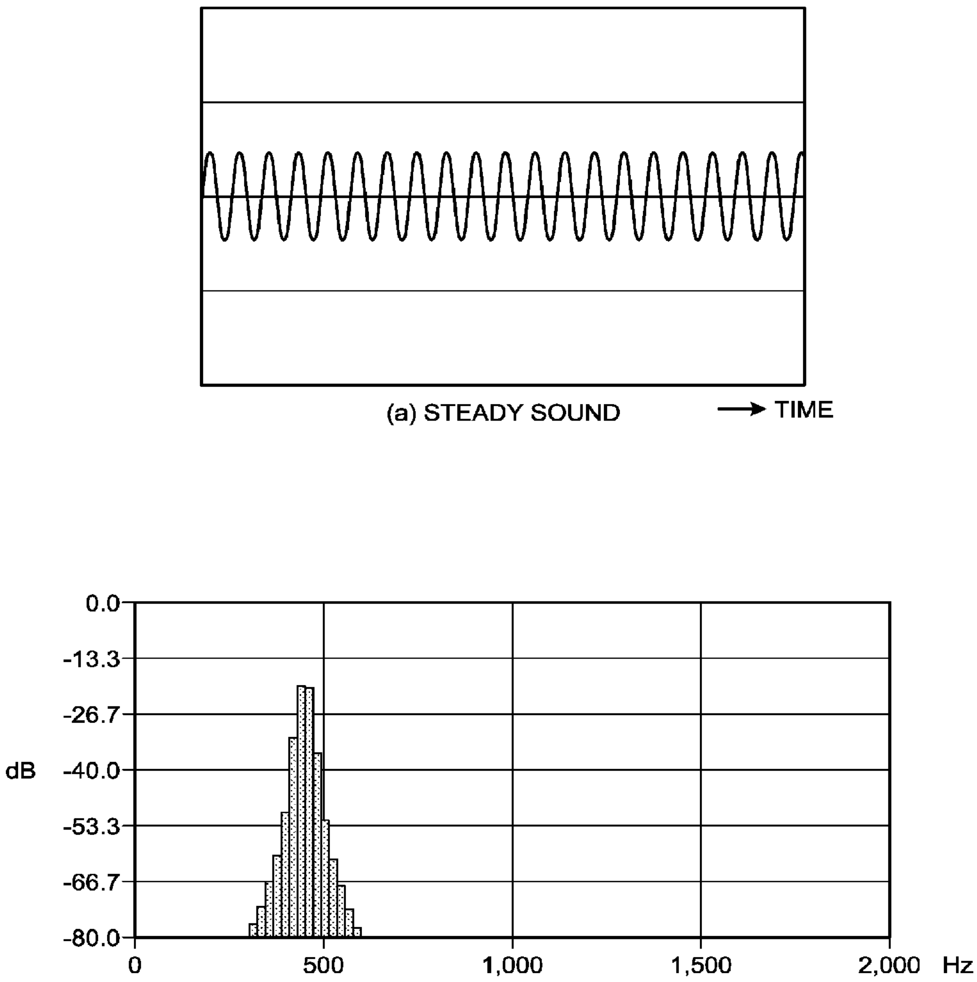
FIG. 1 has graphs illustrating the temporal waveform of a sine wave with an oscillating frequency of 440 Hz as an example of a steady sound and the spectrum thereof.
Figure 2:
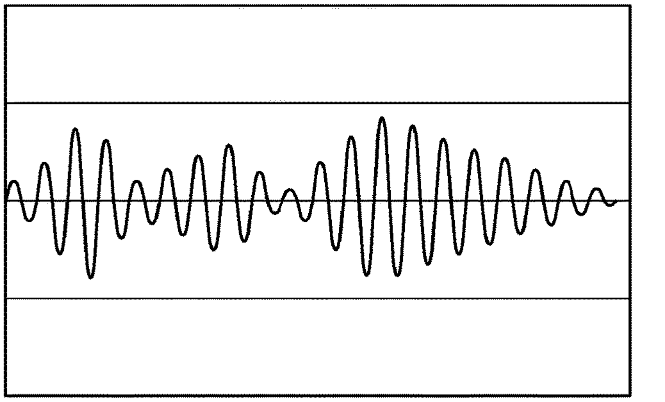
FIG. 2 has graphs illustrating the temporal waveform of an amplitude-modulated sine wave with a center frequency of 440 Hz as an example of an unsteady sound and the spectrum thereof.
Figure 2:
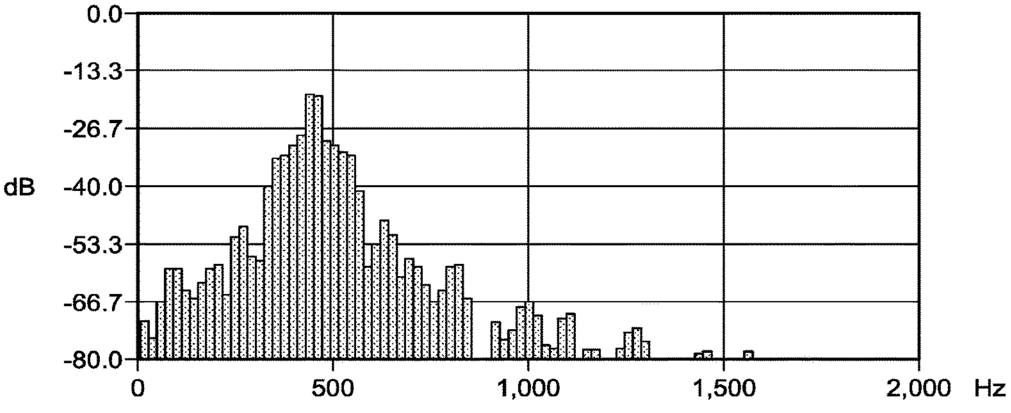
Figure 3:
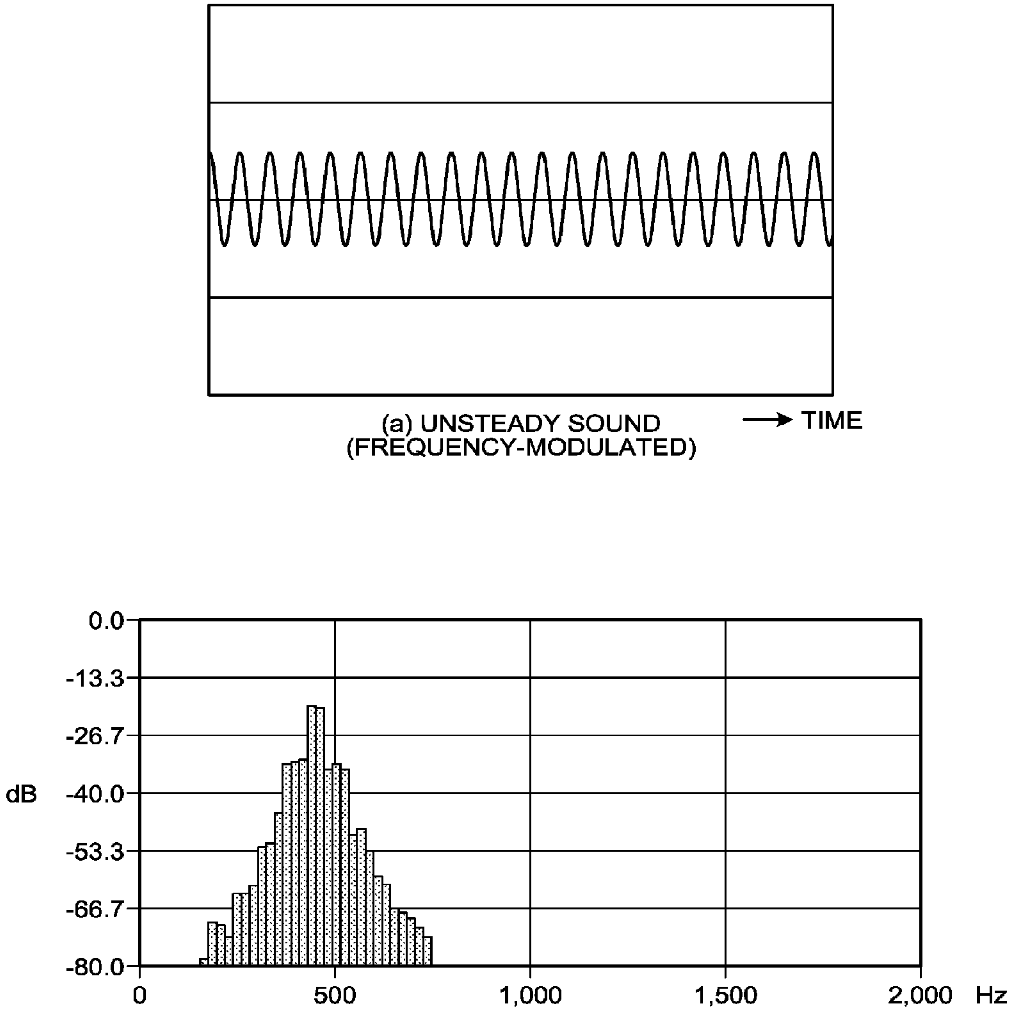
FIG. 3 has graphs illustrating the temporal waveform of a frequency-modulated sine wave with a center frequency of 440 Hz as an example of an unsteady sound and the spectrum thereof.

First, the principle of the present invention will be described. The focus of the invention is on the fact that, when a short-time fast Fourier transform (STFFT) is performed on a steady sound for which the volume and pitch do not change, the result contains a very sharp peak on the frequency axis. FIG. 1 has graphs illustrating an example of a steady sound that has a temporal waveform of a sine wave with an oscillating frequency of 440 Hz (a) and the spectrum thereof (b). FIG. 2 has graphs illustrating an example of an unsteady sound that has a temporal waveform of an amplitude-modulated sine wave with a center frequency of 440 Hz and the spectrum thereof. FIG. 3 has graphs illustrating another example of an unsteady sound that has a temporal waveform of a frequency-modulated sine wave with a center frequency of 440 Hz and the spectrum thereof. All the spectrums illustrated in FIGS. 1 to 3 are spectrums of the frequency range from 0 Hz to 2 kHz extracted from the result of performing the short-time fast Fourier transform on 2048 sampled data that are sampled at a sampling frequency of 44.1 kHz.

When viewing the frequency characteristics illustrated in FIGS. 1 to 3, it can be seen that the steady sound illustrated in FIG. 1 has a sharp peak at a frequency of 440 Hz. Further, it can be seen that, although the unsteady sounds illustrated in FIGS. 2 and 3 also have a peak at the same frequency on the frequency axis as in FIG. 1, because they are being modulated, sideband components occur, and therefore the sharpness of the peak is dulled. This fact means that it is possible to determine whether an audio signal is a steady sound by analyzing the frequency components around the peak in order to determine the sharpness of the peak.

Figure 4:
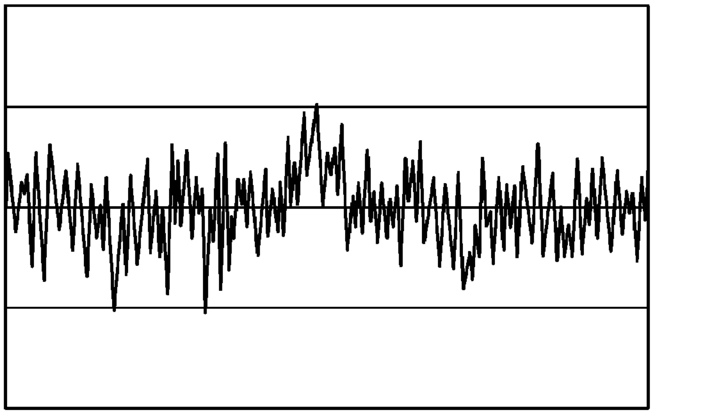
FIG. 4 has graphs illustrating the temporal waveform of an audio signal of a musical composition in which a plurality of sound sources are mixed and the spectrum thereof.
Figure 4:
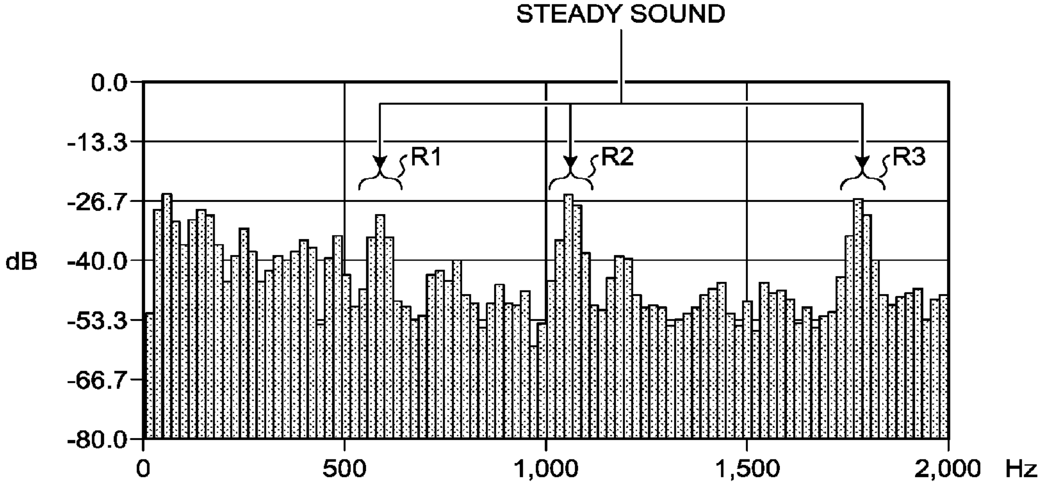

FIGS. 1 to 3 illustrate the results of analyzing sine waves. Even if the audio signal is one in which a plurality of sound sources are mixed, the steady sound and the unsteady sound have the same characteristic in the frequency domain. FIG. 4 has graphs illustrating the temporal waveform of the audio signal of a musical composition in which a plurality of sound sources are mixed and the spectrum thereof, and the short-time fast Fourier transform is performed under the same conditions as in FIG. 1. By referring to FIG. 4, it can be seen that, even though the temporal waveform and frequency characteristic both have a complex shape, there are multiple peaks having a high sharpness on the frequency axis, such as R1, R2, and R3.

The sharp peak portions illustrated in FIG. 4, such as R1 to R3, can be determined to be components of a steady sound, and they correspond to vocal components in the audio signal of this musical composition. Meanwhile, the frequency domain except for the sharp peak portions can be determined to be components of an unsteady sound from rhythm instruments or the like, the volumes and pitches of which change greatly.

Thus, by applying a comb filter that allows only components of the sharp peak portions in the frequency domain to pass to a signal subjected to the short-time fast Fourier transform, it is possible to extract only vocal sounds, i.e., steady sounds. In contrast, by applying a comb filter that blocks only components of the sharp peak portions, a signal having steady sounds eliminated can be obtained.

Figure 5:
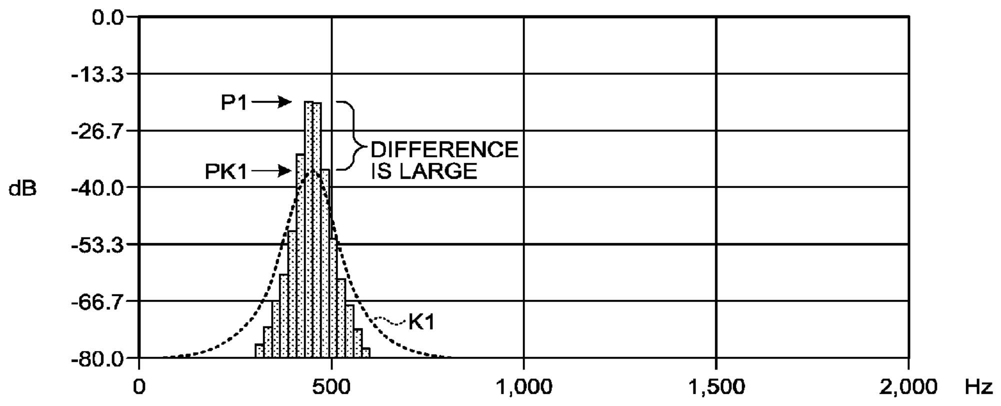
FIG. 5 has graphs explaining a technique for determining the sharpness of a peak portion in the frequency domain.
Figure 5:
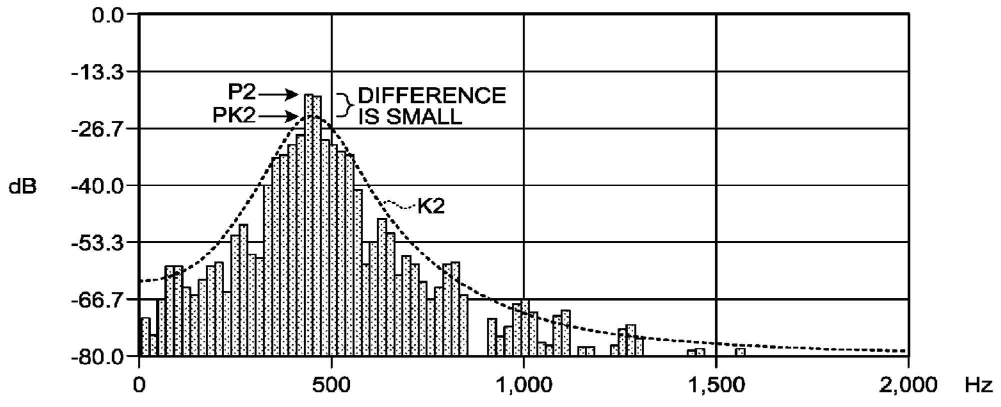

Next, a technique for determining the sharpness of peak portions in the frequency domain will be described. FIG. 5 has graphs explaining this technique; FIG. 5(*a*) shows the spectrum illustrated in FIG. 1(*b*) as an example of the steady sound, i.e., the spectrum obtained by performing the short-time fast Fourier transform on a sine wave with an oscillating frequency of 440 Hz; and FIG. 5(*b*) shows the spectrum illustrated in FIG. 2(*b*) as an example of the unsteady sound, i.e., the spectrum obtained by performing the short-time fast Fourier transform on an amplitude-modulated sine wave with a center frequency of 440 Hz.

In FIG. 5(*a*), K1 indicated by the broken line denotes a waveform obtained by applying a low-pass filter in a frequency axis direction to a signal waveform obtained by performing the short-time fast Fourier transform on a sine wave with an oscillating frequency of 440 Hz so as to smooth the shape of the frequency components. Likewise, in FIG. 5(*b*), K2 indicated by the broken line denotes a waveform obtained by applying a low-pass filter in a frequency axis direction to a signal waveform obtained by performing the short-time fast Fourier transform on an amplitude-modulated sine wave with a center frequency of 440 Hz so as to smooth the shape of the frequency components.

Here, when comparing a maximum value of the peak portion in the spectrum (e.g., P1 in FIG. 5(*a*), hereinafter referred to as the peak value of the spectrum) and a maximum value in the smoothed waveform (e.g., PK1 in FIG. 5(*a*), hereinafter referred to as the peak value of the smoothed waveform), it can be seen that, for the steady sound, the difference between the peak value P1 of the spectrum and the peak value PK1 of the smoothed waveform, i.e., P1-PK1, is large, as illustrated in FIG. 5(*a*) and that, for the unsteady sound, the difference between the peak value P2 of the spectrum and the peak value PK2 of the smoothed waveform, i.e., P2-PK2, is small, as illustrated in FIG. 5(*b*).

As such, the steady sound has a sharp peak portion in the spectrum, whereas the signal level is low in the areas other than the peak portion, and thus components of the peak portion are suppressed by smoothing. As a result, the difference between the peak portions before and after smoothing is large in value. In contrast, the unsteady sound has strong sideband components; therefore, smoothing results in the entire waveform being raised with components of the peak portion also being large. As a result, the difference between the peak portions before and after smoothing is smaller than in the case of the steady sound.

On the basis of the above characteristics, it is possible to compare frequency components calculated using the short-time fast Fourier transform and values smoothed by applying a low-pass filter and to determine that a component whose value before smoothing is greater by a set threshold value or above than the value of the component after smoothing is a steady sound.

Although in FIG. 5 the amplitude is expressed in decibels, i.e., a logarithmic scale, a real number value may be used rather than a logarithmic value in order to reduce the number of calculations. Although FIG. 5 illustrates an amplitude spectrum, a power spectrum may be used. In this case, needless to say, the set threshold value and parameters of the low-pass filter need to be adjusted appropriately.

Figure 6:
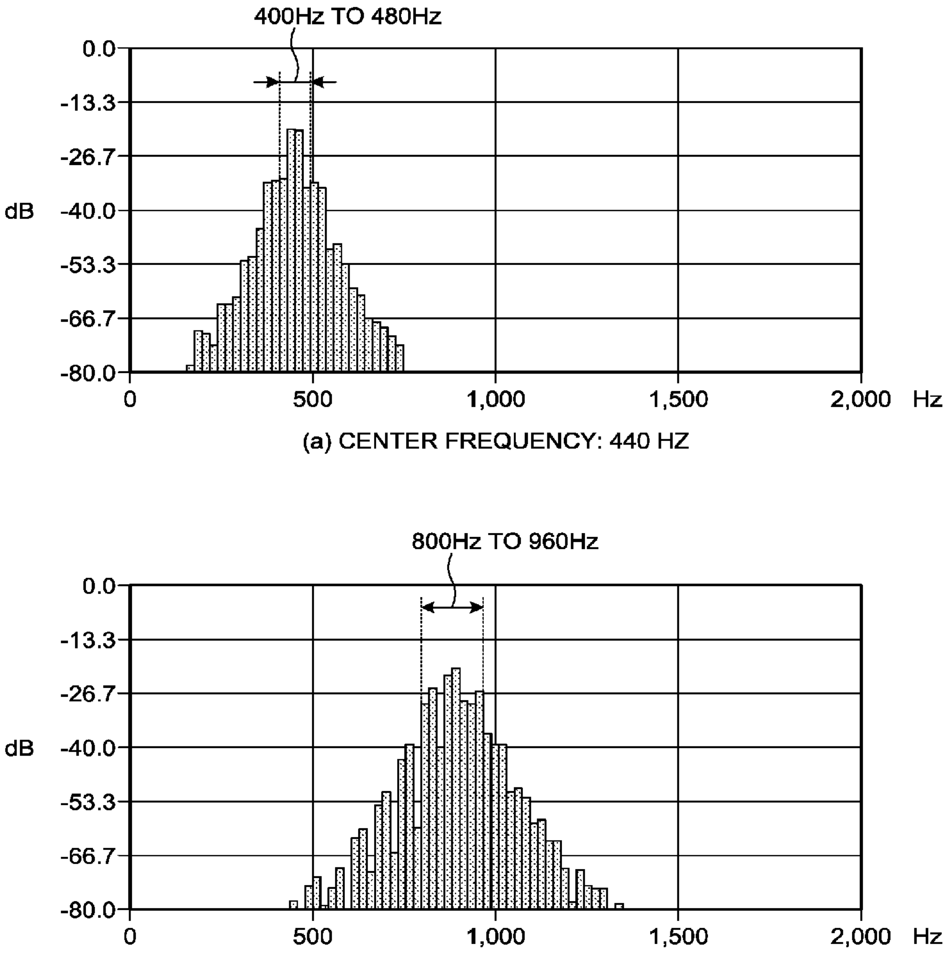
FIG. 6 has graphs explaining that pitch fluctuations depend on the center frequency.

When a low-pass filter is applied to frequency components, how large the width of the amount of change in pitch on the frequency axis becomes needs to be taken into consideration. FIG. 6 has graphs explaining that pitch fluctuations depend on the center frequency. FIG. 6(*a*) is the same as FIG. 3(*b*), which illustrates the spectrum obtained by performing the short-time fast Fourier transform on a frequency-modulated sine wave with a center frequency of 440 Hz. In contrast, FIG. 6(*b*) illustrates the spectrum obtained by performing the short-time fast Fourier transform on a frequency-modulated sine wave with a center frequency of 880 Hz, which is double 440 Hz, under the same conditions as in FIG. 6(*a*).

In the case of a frequency-modulated wave with the same conditions except for the center frequency, when the center frequency doubles, the fluctuation range also doubles. Thus, for the frequency-modulated wave with a center frequency of 880 Hz, the fluctuation range is also double that of the frequency-modulated wave with a center frequency of 440 Hz. Supposing that the fluctuation range of the frequency-modulated wave with a center frequency of 440 Hz is from 400 Hz to 480 Hz as illustrated in FIG. 6(*a*), the range from 800 Hz to 960 Hz illustrated in FIG. 6(*b*), which corresponds to the doubled fluctuation range, coincides with the spread of the waveform of the peak portion. It is understood from this fact that, when a low-pass filter is applied in order to determine a steady sound, it is essential to adjust the filter coefficients such that the higher the frequency band is, the smoother the spectrum becomes. By this adjustment of the filter coefficients, appropriate determination taking pitch fluctuations into account becomes possible.

After a steady sound is successfully determined by using the above technique, a comb filter is constructed on the basis of the result of the determination. If a low-pass filter for determining a steady sound is a first filter, the comb filter is a second filter. The first filter is a unit that determines the filter coefficients of the second filter. A signal subjected to the short-time fast Fourier transform is input to the comb filter, which is dynamically constructed according to the filter coefficients determined by the first filter, and an inverse Fourier transform is performed on the output of the comb filter, whereby a desired audio signal, i.e., an audio signal of the extracted steady sound or an audio signal with the steady sound eliminated can be obtained.

Example Configuration to Realize Present Invention

Figure 7:
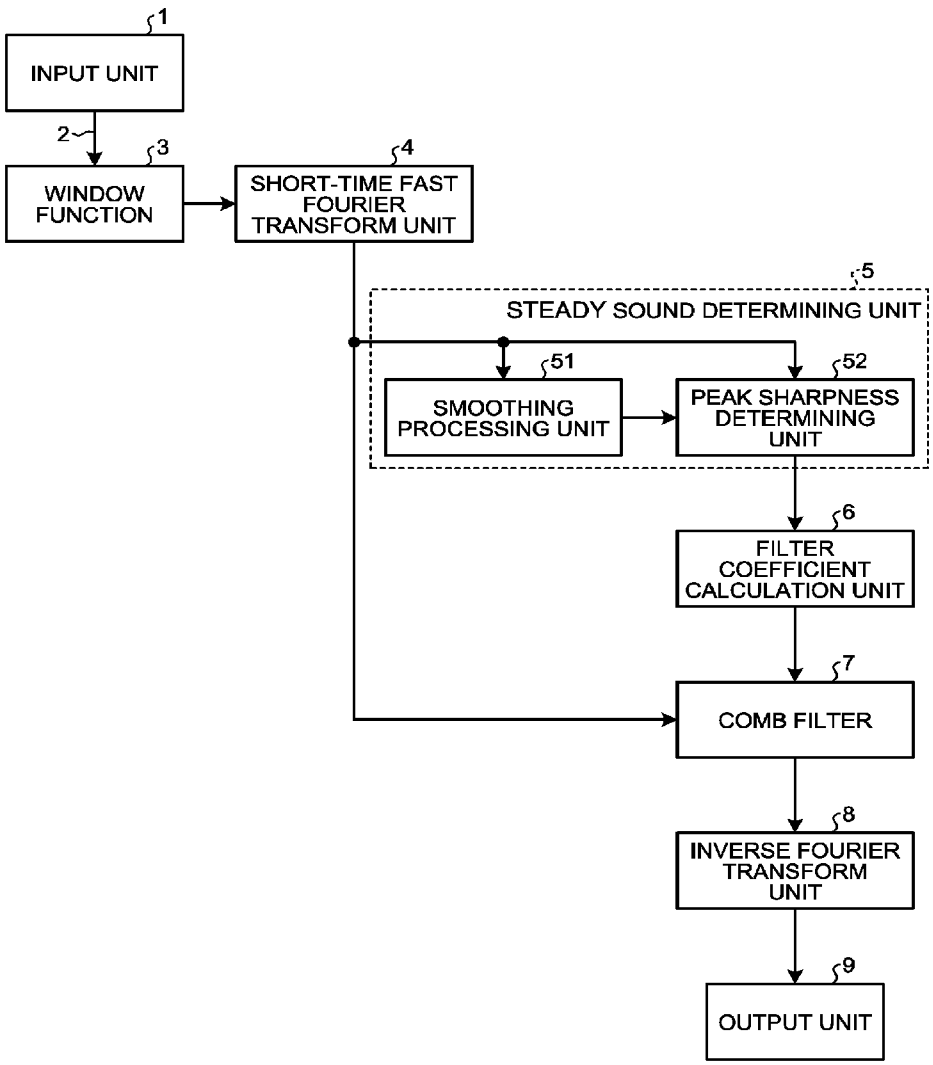
FIG. 7 is a functional block diagram illustrating an example for realizing an audio signal processing device according to the present embodiment.

FIG. 7 is a block diagram illustrating an example for realizing the audio signal processing device according to the present embodiment. As illustrated in FIG. 7, the audio signal processing device according to the present embodiment is configured to include an input unit 1, a short-time fast Fourier transform unit 4, a steady sound determining unit 5, a filter coefficient calculation unit 6, a comb filter 7, an inverse Fourier transform unit 8, and an output unit 9.

The input unit 1 is a server to be connected to, for example, a storage device and an external network, and an audio signal 2 is taken into the device via the input unit 1. The short-time fast Fourier transform unit 4 performs a short-time fast Fourier transform on the taken-in audio signal 2 while applying a window function 3 thereto. Here, a supplementary description of the short-time fast Fourier transform performed by the short-time fast Fourier transform unit 4 will be given.

The length of an audio signal waveform that can be analyzed in one application of a short-time fast Fourier transform is determined depending on the window function and the FFT size that will be used. For example, if a digital audio waveform discretized at 44.1 kHz is to be processed, 2048 points are used for the window function and FFT size. Thus, the width on the time axis is about 46.5 msec and data in increments of about 22 Hz is obtained on the frequency axis, and thus the balance between frequency resolution and time resolution is good. If the frequency resolution is made higher, the FFT size is increased, and if the time resolution is made higher, the FFT size is reduced. For example, if 1024 points are used for the window function and FFT size, the width on the time axis is about 23.2 msec and data in increments of about 43 Hz is obtained on the frequency axis. That is, reducing the window function and FFT size by half results in the time resolution doubling and the frequency resolution halving. In contrast, doubling the window function and FFT size results in the time resolution halving and the frequency resolution doubling.

Referring back to FIG. 7, the signal in the frequency domain generated by the short-time fast Fourier transform unit 4 is input to the steady sound determining unit 5 and the comb filter 7. The steady sound determining unit 5 includes a smoothing processing unit 51 and a peak sharpness determining unit 52. The smoothing processing unit 51 smooths the output signal from the short-time fast Fourier transform unit 4. The peak sharpness determining unit 52 performs threshold determination on the output difference between the output signal from the short-time fast Fourier transform unit 4 and the output signal from the smoothing processing unit 51, i.e., differences between the output signal values before smoothing and the output signal values after smoothing, so as to determine a component for which the difference is greater than or equal to a threshold value as a peak portion having a high sharpness. The determination made by the peak sharpness determining unit 52 is performed over the frequency range of interest. Thus, the component determined by the peak sharpness determining unit 52 is one determined to be a steady sound.

The result of the determination made by the peak sharpness determining unit 52, i.e., the result of the determination made by the steady sound determining unit 5, is input to the filter coefficient calculation unit 6. The filter coefficient calculation unit 6 calculates filter coefficients that determine the filter characteristics of the comb filter 7 on the basis of the determination result constantly coming in from the steady sound determining unit 5. The comb filter 7 operates according to the filter coefficients calculated by the filter coefficient calculation unit 6 so as to filter the output signal from the short-time fast Fourier transform unit 4. The inverse Fourier transform unit 8 transforms a signal in the frequency domain output from the comb filter 7 into a signal in the time domain and outputs the transformed signal to the output unit 9. The output unit 9 is an audio output device, such as a DA converter or a speaker, and by inputting the signal generated by the inverse Fourier transform unit 8 to the output unit 9, a desired audio signal can be reproduced. Note that switching between producing an audio signal of an extracted steady sound and producing an audio signal that has a steady sound eliminated can be performed at will by changing the filter characteristics of the comb filter 7.

Figure 8:
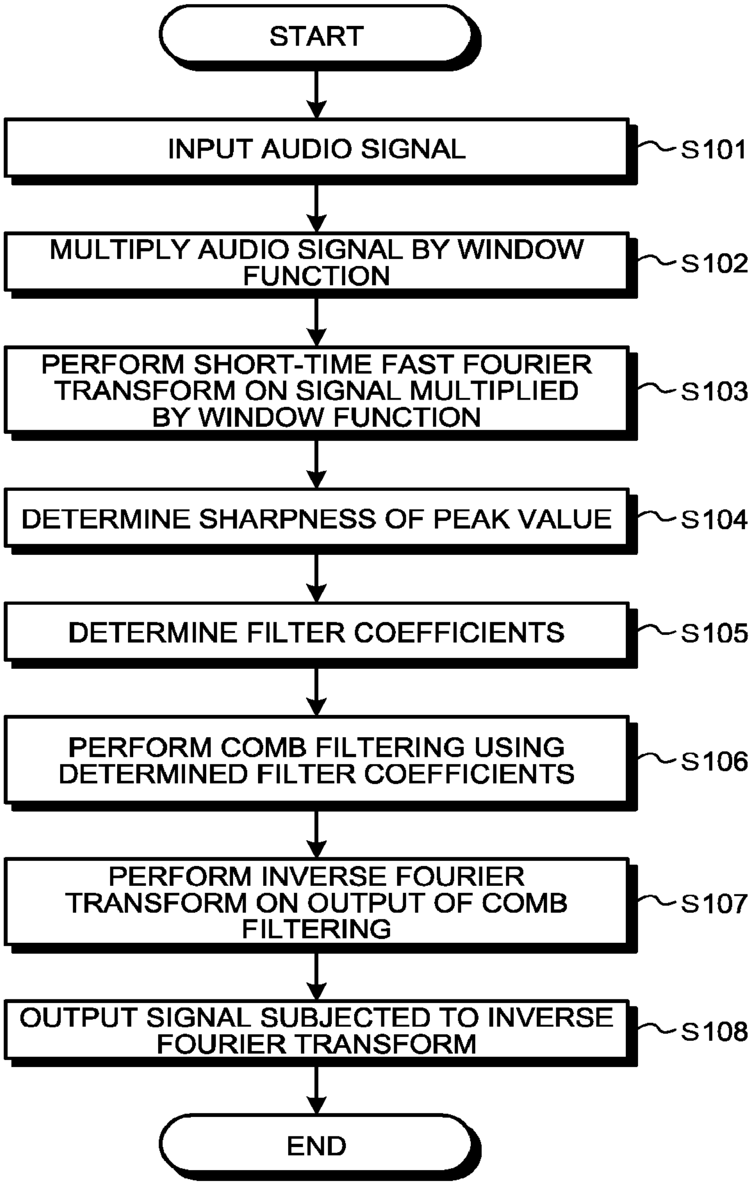
FIG. 8 is a flowchart illustrating in a time series the process for realizing an audio signal processing method according to the present embodiment.

FIG. 8 is a flowchart illustrating in a time series the process for realizing the audio signal processing method according to the present embodiment. That is, in the audio signal processing method according to the present embodiment, an audio signal to be processed is input (step S101); the audio signal is multiplied by a window function (step S102); a short-time fast Fourier transform is performed on the signal multiplied by the window function (step S103); the sharpness of a peak value of the signal subjected to the short-time fast Fourier transform is determined (step S104); filter coefficients to determine the filter characteristics of the comb filter are determined on the basis of the result of determining the sharpness of the peak value (step S105); filtering is performed on the output of the short-time fast Fourier transform by the comb filter dynamically constructed using the determined filter coefficients (step S106); an inverse Fourier transform is performed on the output of the comb filtering (step S107); and finally the signal subjected to the inverse Fourier transform is output (step S108).

In the above process, the processing at step S104 corresponds to the process of determining whether the waveform of a peak portion contained in the signal waveform in the frequency domain generated by the processing at step S103 is a steady sound. The processing at step S104 can be the process of applying a low-pass filter in a frequency axis direction to a signal subjected to a short-time fast Fourier transform so as to smooth the signal waveform as described for the processing by the smoothing processing unit 51 of FIG. 7. Alternatively, the processing of FIG. 9 described below may be used as the processing at step S104.

Figure 9:
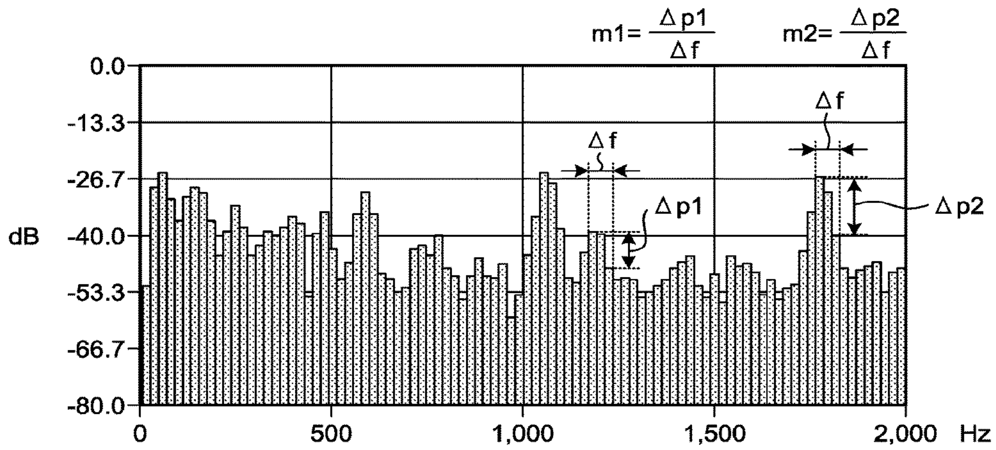
FIG. 9 is a graph explaining another technique for determining the sharpness of a peak portion in the frequency domain.

FIG. 9 is a graph explaining another technique for determining the sharpness of a peak portion in the frequency domain. In contrast to FIG. 5, which describes a process of applying a low-pass filter in a frequency axis direction to a signal subjected to a short-time fast Fourier transform so as to smooth the signal waveform, here a technique that does not use a low-pass filter will be described.

FIG. 9 illustrates the same spectrum as that illustrated in FIG. 4(*b*). In the case of a musical composition in which a plurality of sound sources are mixed as illustrated in FIG. 9, a sharp peak portion and a non-sharp peak portion appear in the spectrum as mentioned previously, and the technique described here is to evaluate a drop amount $\Delta p$ from the peak value with respect to a preset frequency width $\Delta f$. Specifically, the drop amount $\Delta p$ is evaluated using an amplitude drop rate m ($=\Delta p/\Delta f$), which is the ratio of the drop amount $\Delta p$ to the frequency width $\Delta f$. For example, for the peak portion on the left in FIG. 9, because the amplitude drop rate m1 ($=\Delta p1/\Delta f$) is small, it is not determined as a sharp peak portion. In contrast, for the peak portion on the right in FIG. 9, because the amplitude drop rate m2 ($=\Delta p2/\Delta f$) is large, it is determined as a sharp peak portion. The determining method can, for example, use a threshold. Note that it is preferable to take fluctuations on the frequency axis into account in this determination as described with reference to FIG. 6.

Figure 10:
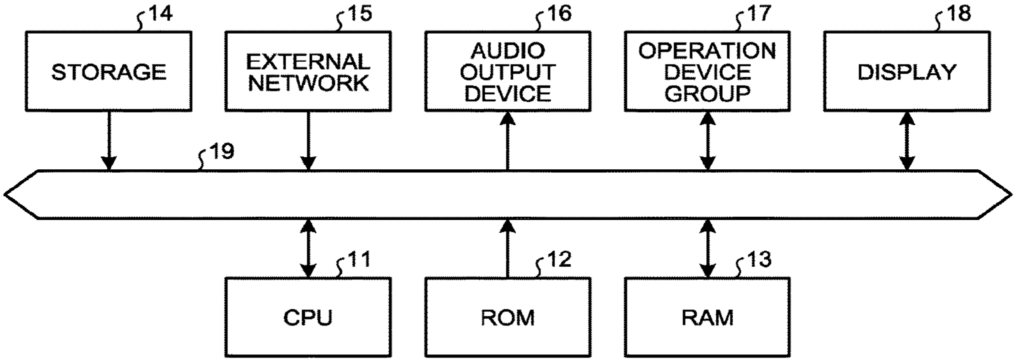
FIG. 10 is a diagram illustrating an example hardware configuration for realizing the audio signal processing device and the audio signal processing method according to the present embodiment.

Finally, a hardware configuration for realizing the audio signal processing device and the audio signal processing method according to the present embodiment will be described. FIG. 10 is a diagram illustrating an example hardware configuration for realizing the audio signal processing device and the audio signal processing method according to the present embodiment.

In FIG. 10, a CPU 11 is a processor providing overall control. A ROM 12 is a read only memory storing a control program. A RAM 13 is a random access memory used as a working memory area or the like. A storage 14 is an external storage device, such as a hard disk or a silicon memory, and is used, for example, for the input of an audio signal. An audio signal can be input also via a server (not illustrated) connected to an external network 15.

An audio output device 16 is configured from a DA converter that converts a digital audio signal to analog form, a speaker, and the like. An operation device group 17 includes operation buttons and operation icons for controlling the reproduction of audio signals. A display 18 is a unit that displays the reproduction state. An internal network 19 is a communication unit for realizing communication between the constituents and is, for example, an internal bus, a radio communication unit, or a network adapter.

A program including instructions to cause a processor or computer to execute the audio signal processing device and the audio signal processing method according to the present embodiment is, for example, stored in the ROM 12 or stored in the RAM 13. The CPU 11 executes the above waveform processing on an audio signal stored in the storage 14 or an audio signal input from the server (not illustrated) via the external network 15 using the RAM 13 as a working memory so as to output the audio signal as sound via the audio output device 16. The above configuration can realize an audio signal processing device and an audio signal processing method that can extract or eliminate a steady sound in real time from an audio signal containing a plurality of sound sources.

As described above, the audio signal processing device and the audio signal processing method according to the present embodiment perform a short-time fast Fourier transform on an input audio signal to generate a signal in the frequency domain; determines whether the waveform of a peak portion contained in the waveform of the signal in the frequency domain is a steady sound; dynamically calculates filter coefficients for comb filtering on the basis of the determination result; and transforms the output of the comb filter, which operates according to the calculated filter coefficients, into a signal in the time domain to be output and thus can extract or eliminate a steady sound in real time with a relatively simple configuration without depending on the number of input signal channels and without performing, for example, a pre-training.

The configuration illustrated in the above embodiment represents an example of the content of the present invention and can be combined with other publicly known techniques, and part of the configuration can be omitted or changed without departing from the spirit of the present invention.

For example, it is effective to combine the present invention with a general signal processing such as estimating the localization of a sound image by using a band pass filter or the amplitude ratio of a stereo signal. For example, in the case of a mastered musical composition in which sound sources, i.e., a vocal and a drum, exist in the center position, the conventional art cannot individually separate the vocal and the drum, but using the present invention enables elimination of only the vocal.

REFERENCE SIGNS LIST

1 input unit, 2 audio signal, 3 window function, 4 short-time fast Fourier transform unit, 5 steady sound determining unit, 6 filter coefficient calculation unit, 7 comb filter, 8 inverse Fourier transform unit, 9 output unit, 11 CPU, 12 ROM, 13 RAM, 14 storage, 15 external network, 16 audio output device, 17 operation device group, 18 display, 19 internal network, 51 smoothing processing unit, 52 peak sharpness determining unit.

The invention claimed is:

1. An audio signal processing device that separates a specific sound source from an audio signal in which a plurality of sound sources are mixed and extracts or eliminates the specific sound source, the audio signal processing device comprising:

a short-time fast Fourier transform unit that performs a short-time fast Fourier transform on an input audio signal;

a steady sound determining unit that includes a smoothing processing unit that applies a low pass filter to a signal in a frequency domain generated by the short time fast Fourier transform unit to smooth the signal in a frequency domain and a peak sharpness determining unit that determines a sharpness of a waveform of a peak portion included in a waveform of the signal in a frequency domain on a basis of an output difference between the signal in a frequency domain and a signal output from the smoothing processing unit and that determines whether the waveform of the peak portion included in the waveform of the signal in a frequency domain is a steady sound;

a filter coefficient calculation unit that dynamically calculates a filter coefficient on a basis of a result of determination made by the steady sound determining unit;

a comb filter that operates according to the filter coefficient calculated by the filter coefficient calculation unit so as to filter a signal output from the short-time fast Fourier transform unit; and an inverse Fourier transform unit that transforms an output of the comb filter into a signal in a time domain and outputs the signal in a time domain, wherein when the low pass filter is applied, the steady sound determining unit adjusts the filter coefficient such that the higher a frequency band is, the smoother the waveform of the signal is.

2. The audio signal processing device according to claim 1, wherein the filter coefficient of the comb filter is dynamically constructed according to a filter coefficient of the low pass filter.

3. An audio signal processing method of separating a specific sound source from an audio signal in which a plurality of sound sources are mixed and extracting or eliminating the specific sound source, the audio signal processing method comprising:

a first step of performing a short-time fast Fourier transform on an input audio signal;

a second step of applying a low pass filter to a signal in a frequency domain generated at the first step to smooth the signal in a frequency domain;

a third step of determining a sharpness of a waveform of a peak portion included in a waveform of the signal in a frequency domain on a basis of an output difference between the signal in a frequency domain and a signal output at the second step;

a fourth step of determining whether the waveform of the peak portion is a steady sound on a basis of a result of determination at the third step;

a fifth step of dynamically calculating a filter coefficient for comb filtering on a basis of a result of determination at the fourth step;

a sixth step of filtering the signal in a frequency domain generated at the first step using the filter coefficient calculated at the fifth step; and a seventh step of transforming an output of filtering at the sixth step into a signal in a time domain and outputting the signal in a time domain, wherein the second step includes, when applying the low pass filter, adjusting the filter coefficient such that the higher a frequency band is, the smoother the waveform of the signal is.

4. The audio signal processing method according to claim 3, wherein the filter coefficient for comb filtering is dynamically determined according to a filter coefficient of the low pass filter.

5. An audio signal processing method of separating a specific sound source from an audio signal in which a plurality of sound sources are mixed and extracting or eliminating the specific sound source, the audio signal processing method comprising:

a first step of performing a short-time fast Fourier transform on an input audio signal;

a second step of evaluating, for a waveform of a peak portion included in a waveform of a signal in a frequency domain, an amplitude drop rate that is a ratio of a drop amount from a peak value of the peak portion in a preset frequency width to the frequency width;

a third step of determining, on a basis of a result of evaluation at the second step, whether the waveform of the peak portion is a steady sound;

a fourth step of dynamically calculating a filter coefficient for comb filtering on a basis of a result of determination at the third step;

a fifth step of filtering the signal in a frequency domain generated at the first step using the filter coefficient calculated at the fourth step; and a sixth step of transforming an output of filtering at the fifth step into a signal in a time domain and outputting the signal in a time domain, wherein the second step includes, when evaluating the amplitude drop rate, adjusting the filter coefficient such that the higher a frequency band is, the smaller an evaluated value of the amplitude drop.

6. A non-transitory computer-readable recording medium that stores therein an audio signal processing program that causes a processor to execute the audio signal processing method according to claim 5.

* * * * *